Figure 1:
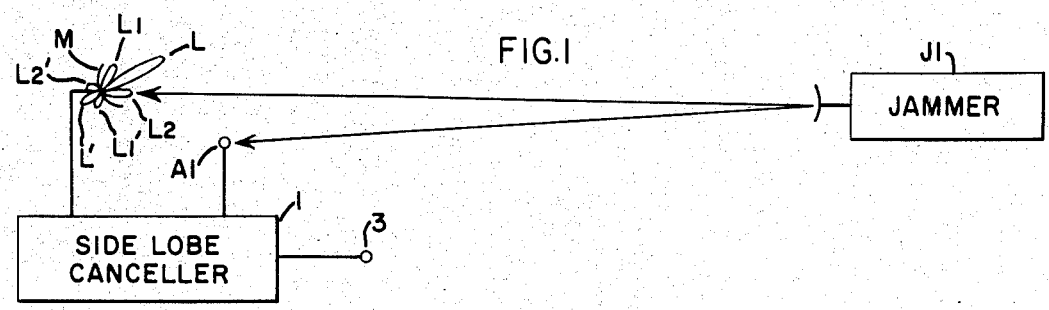

United States Patent [19]

Downie

[11] Patent Number: 4,628,320

[45] Date of Patent: Dec. 9, 1986

[54] CANCELLATION OF SCATTER JAMMING

[75] Inventor: John W. Downie, Dewitt, N.Y.

[73] Assignee: General Electric Company, Syracuse, N.Y.

[21] Appl. No.: 363,645

[22] Filed: Apr. 29, 1964

[51] Int. Cl.4 .................... G01S 3/16; G01S 3/28; G01S 7/36

[52] U.S. Cl. ................................ 342/16; 342/189; 342/379

[58] Field of Search ............ 343/18 E, 18 R, 100 LE, 343/17.1 R, 5, 100 CL, 379

[56] References Cited

U.S. PATENT DOCUMENTS 3,171,126  2/1965  Wiley ................................ 343/458
3,202,990  8/1965  Howells ............................. 343/381

Primary Examiner—Stephen C. Buczinski
Attorney, Agent, or Firm—Carl W. Baker; Richard V. Lang

[57] ABSTRACT

In side-lobe cancelling equipment direct jammer signals appearing in an auxiliary antenna channel are better correlated with reflected jammer signals in a main antenna channel by splitting the signal in the auxiliary channel into two parts, one of which is directly correlated with direct jammer signals in the main channel and the other is passed through a delay line to alter its timing to match the timing of the reflected jammer signals in the main channel.

6 Claims, 12 Drawing Figures

60 ---- OMNI LOOPS OFF
62 ——— ONE OMNI UNDELAYED LOOP ON
64 ▨▨▨ ONE UNDELAYED AND ONE DELAYED LOOP ON
66 ▬▬▬ ULTIMATE GOAL

AZIMUTH FROM JAMMER IN DEGREES
SIDE LOBE CANCELLER OFF

AZIMUTH FROM JAMMER IN DEGREES
SIDE LOBE CANCELLER ON

AZIMUTH FROM JAMMER IN DEGREES
SCATTER CANCELLER ON

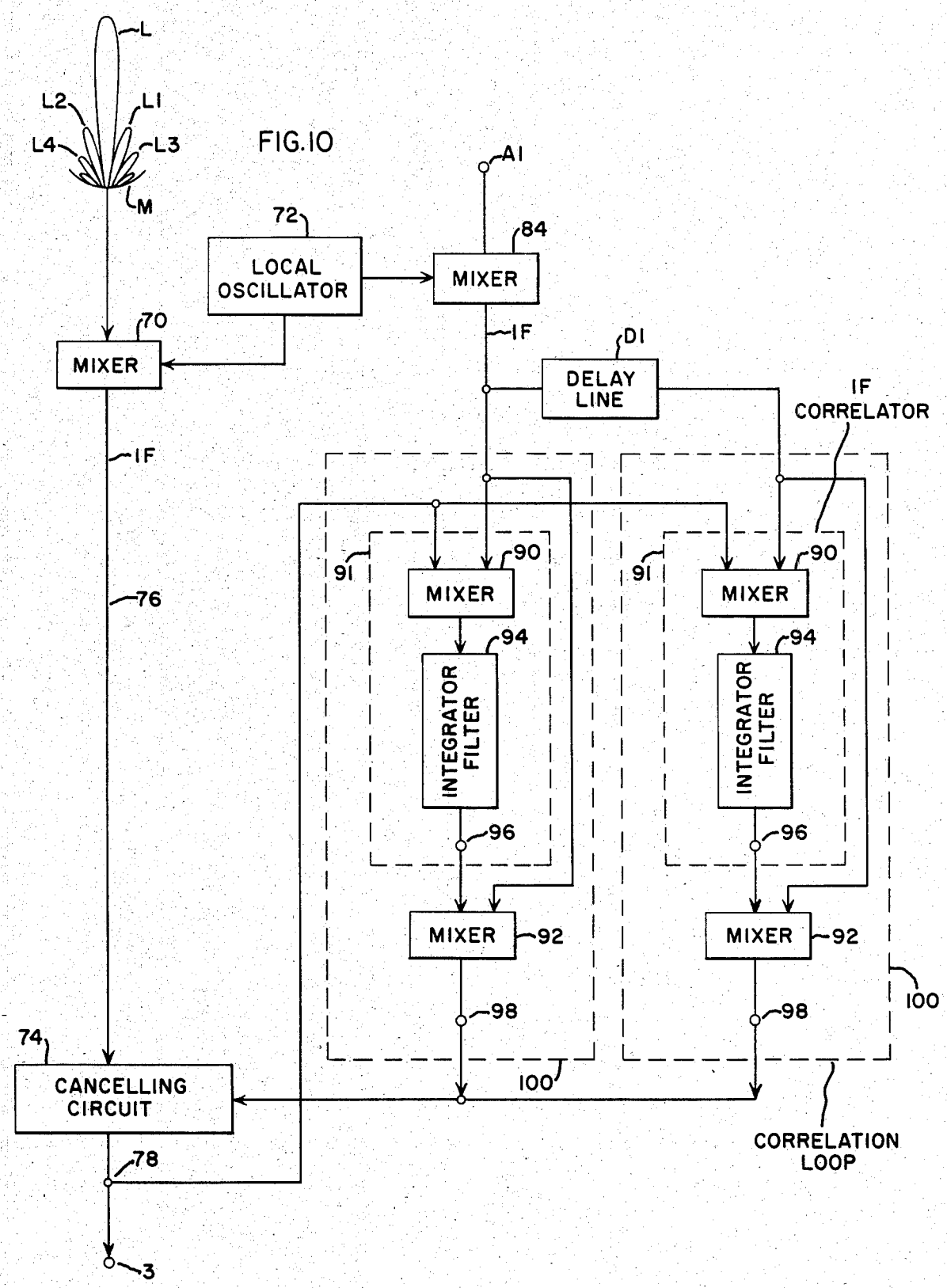

CANCELLATION OF SCATTER JAMMING

The present invention relates to means for processing radar signals to eliminate certain undesired signals such as jammer signals and particularly to means for eliminating or cancelling "scatter energy" which is made up of reflected jammer signals.

Among the prior art devices for cancelling jammer signals are those which employ omni-antennas and correlators to provide correcting signals which can be used to correct for, or to cancel, jammer signals received into the side-lobes of a main or primary antenna. These devices have been evolved to the point where they can be used to correct for a multiplicity of different jammer signals. Even so, it has been found at some radar sites that the desired correction is not obtained. Investigation has revealed that at some of these radar sites one or more solid objects, such as buildings and towers associated with other radar installations, cause reflections of jammer signals which enter the radar antenna main beam. Such reflected jammer signals, which may be called scatter energy, generally are poorly correlated with the original jammer signals received by the omni-antenna due to differences in travel time. Such poorly correlated signals are not adequately processed by the cross-correlators and large residues of undesired jammer signals remain in the main radar channels.

It is, therefore, a primary object of this invention to provide means for automatically cancelling scatter energy, or reflected jammer signals.

It is a further object of this invention to provide means operable, at intermediate frequencies with existing intermediate frequency radar signal processing equipment, to extend the capabilities of jammer signal cancellers to the cancellation of reflections of jammer signals.

The foregoing objects and others ancillary thereto may be accomplished in side-lobe cancelling equipment by adjusting the time relationship of direct jammer signals appearing in the auxiliary antenna channel to correlate better with the reflected jammer signals in the main channel. This better correlation is accomplished in a preferred embodiment of the invention by splitting the signal in the auxiliary channel into two parts, one of which is passed to a first correlator for correlation with direct jammer signals in the main channel and the other is passed through a delay line to alter its timing to match the timing of the reflected jammer signals in the main branch. The delayed signals are then correlated with the main signal in a separate correlator to develop signals of use in cancelling the reflected jammer signals.

Figure 5:
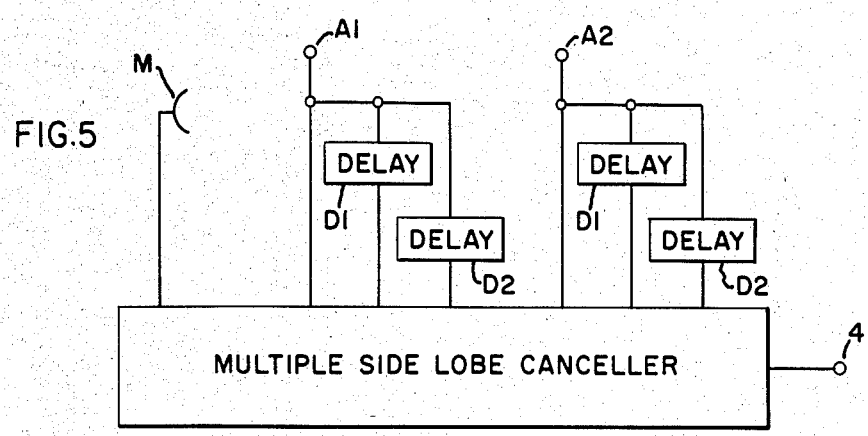
Figure 6:
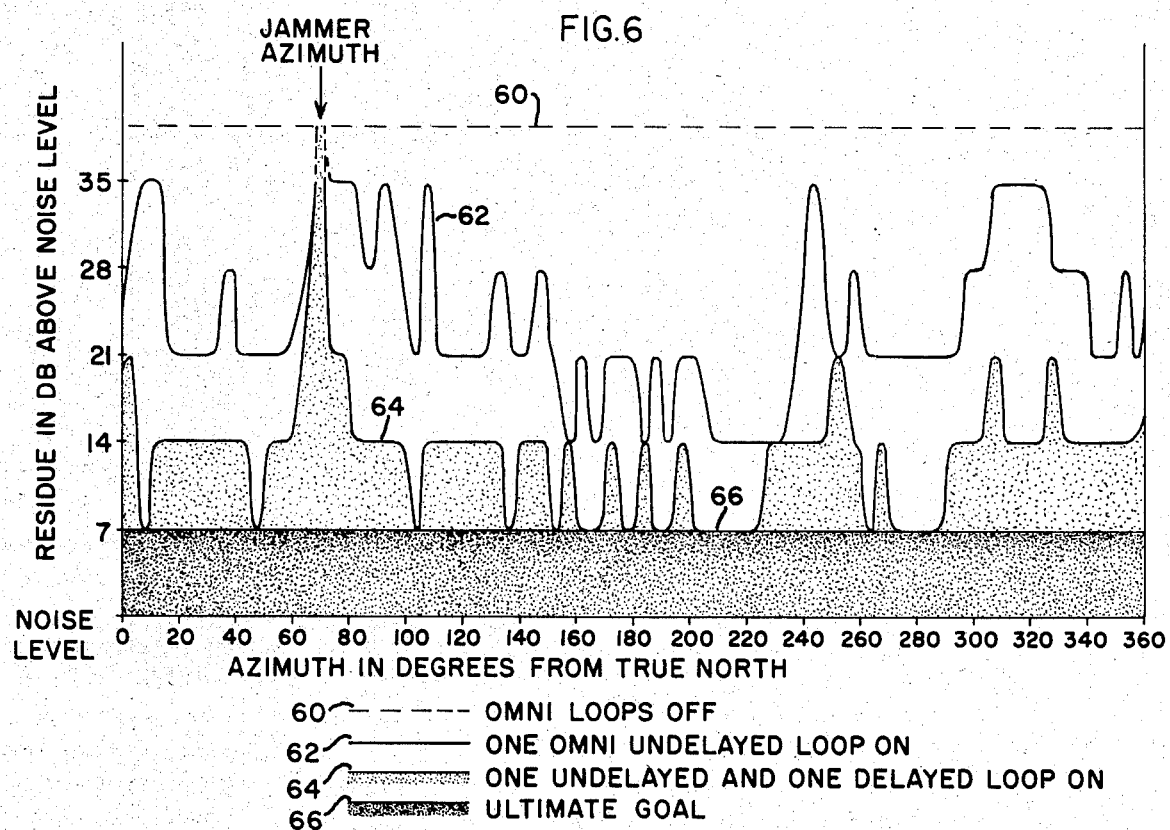

The novel features that I consider to be characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which FIG. 1 is a block diagram illustrating the application of a side lobe canceller to cancellation of directly received jammer signals, FIG. 2 is a block diagram illustrating the application of side lobe cancellers to the problem of coping with a plurality of sources of jammer signals, FIG. 3 is a diagram showing relationships between directly received jammer signals and reflected jammer signals, FIG. 4 is a block diagram showing an application of an embodiment of the invention to the problem of cancelling scatter energy, FIG. 5 is a block diagram showing an embodiment of the invention capable of cancelling multiple jamming signals producing scatter energy having more than one time delay, FIG. 6 is a graphical representation of various levels of cancellation obtained experimentally by use of an I-F single side lobe canceller with and without a delayed correlator loop.

Figure 7:
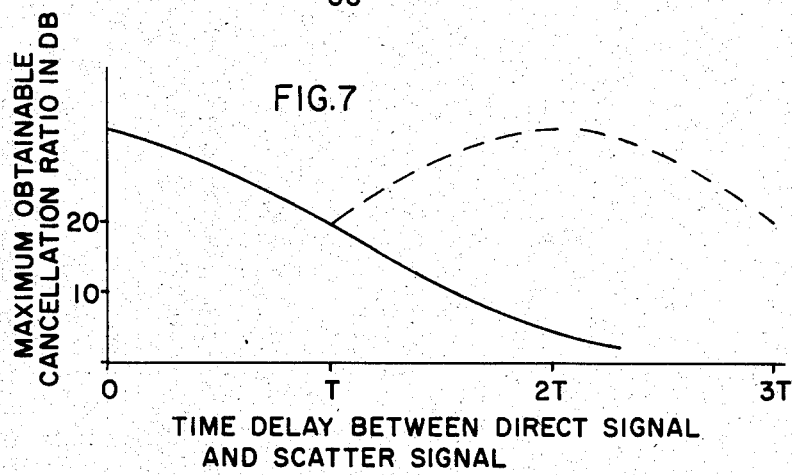

FIG. 7 is a graph to depict the deterioration (solid line) of cancellation ratio as time delay of scatter jamming is increased and to show the improvement produced (dashed line) by the addition of one delayed cancellation loop.

Figure 4:
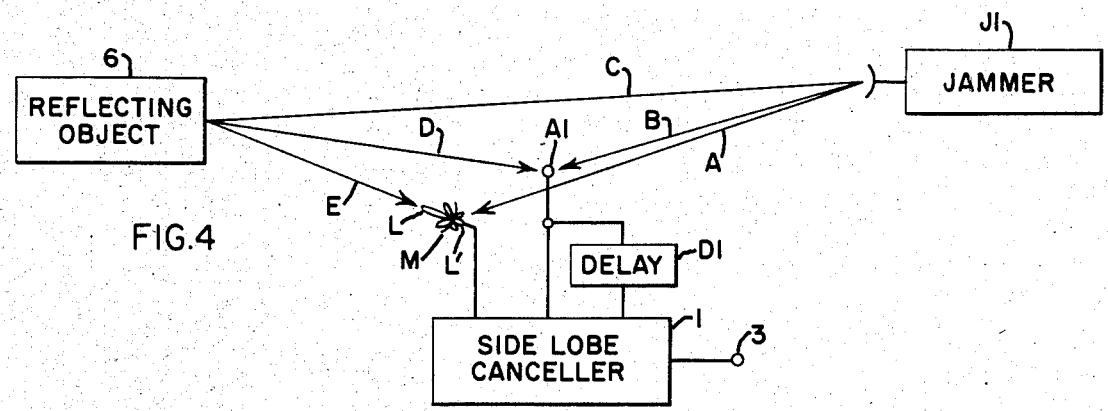
Figure 8:
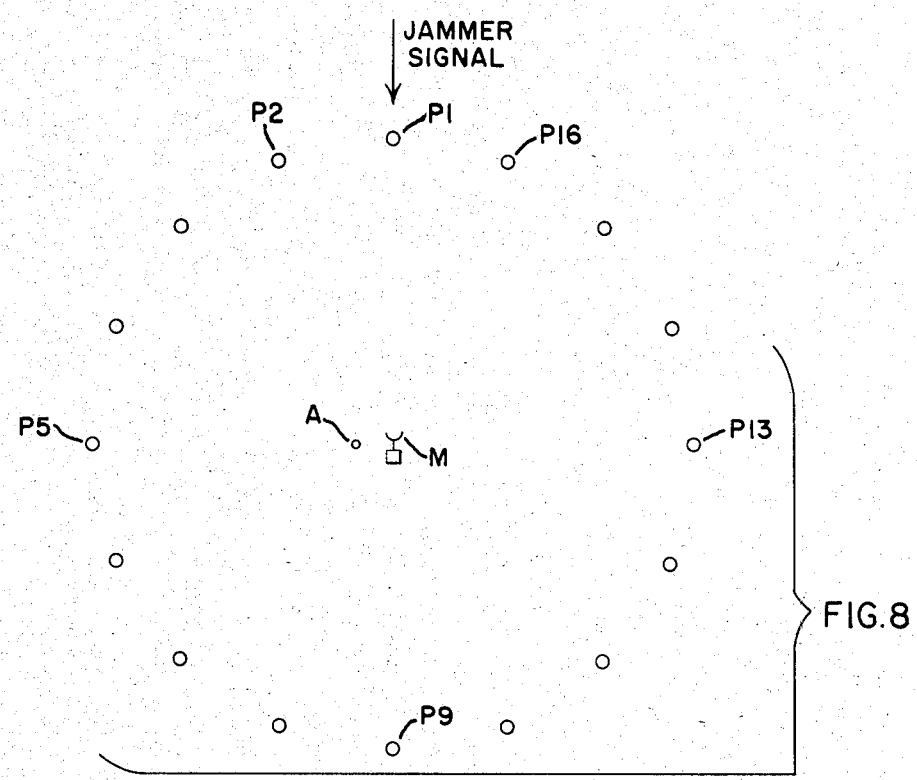
Figure 9A:
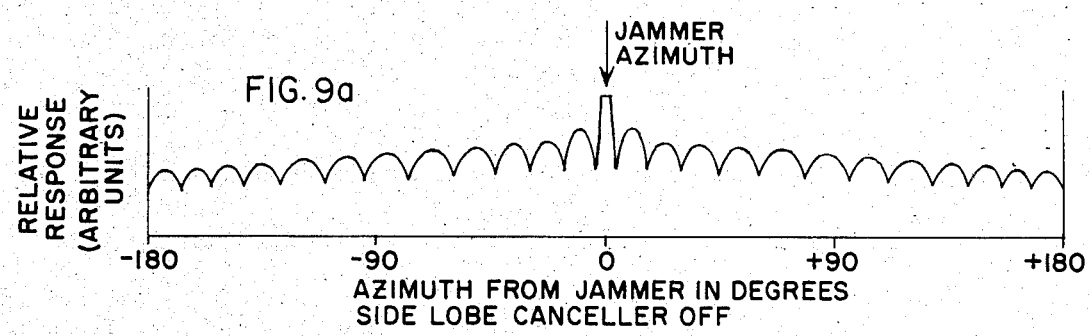

FIG. 8 is a plan view of an arrangement of poles spaced about a radar installation, FIGS. 9a, b and c is a group of graphs showing the relative response of a radar system to jammer signals and showing the cancellation obtainable with and without equipment constructed in accordance with the present invention, and FIG. 10 is a more detailed diagram showing a side lobe canceller embodying the invention as it is depicted in FIG. 4.

Figure 2:
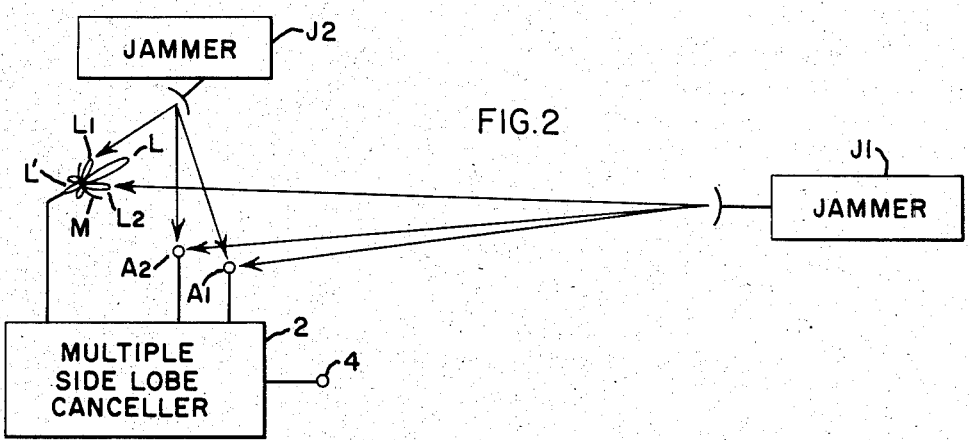
Figure 3:
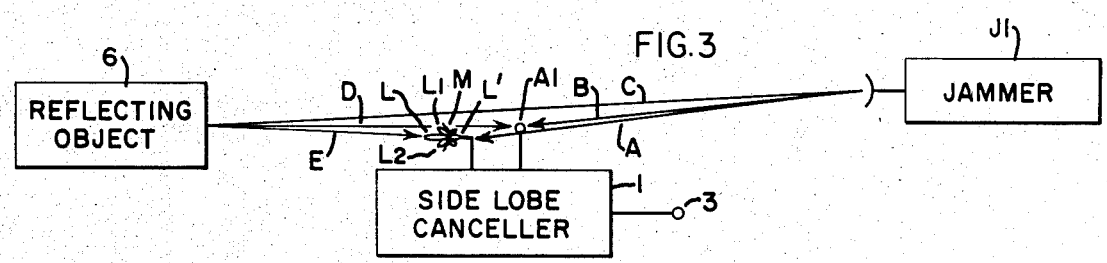

Turn first to FIG. 1 and FIG. 2 for background information of help in the explanation of the present invention. FIG. 1 shows in general the relationships between a directional antenna M having a main lobe L and number of auxiliary lobes, such as L1 and L2, which are commonly called side lobes as well as corresponding back lobes at L', L1' and L2'. These lobes, of course, are well known as being due to phase relations between signal paths converging at the antenna horn and they need not be discussed. The side lobe canceller indicated by Block 1 receives jamming signals from the jammer J1 through an omni-directional antenna at A1 and also through the side lobe L2 of the antenna M. The side lobe canceller then correlates these jamming signals and corrects for them so that radar signals received in the main lobe L can be processed and supplied at a terminal 3 free of the jamming signals in the side lobe L2. This capability of cancelling undesirable signals appearing through the side lobes of the antenna has been extended to situations where more than one jamming signal is present, such as originate from sources like J1 and J2 in FIG. 2. The system in FIG. 2 functions much like the system of FIG. 1, but employs a number of cancellers in place of one to provide output signals at terminal 4 which represent the desired radar intelligence received on the main lobe L of the antenna M, minus direct jamming signals.

For more detailed descriptions of the functioning of single and multiple side lobe cancellers reference should be made to the following copending applications, which are hereby incorporated by reference. The first of these is a patent application of Paul W. Howells entitled "Intermediate Frequency Side-Lobe Canceller", application Ser. No. 810,961, which was filed on May 4, 1959 and assigned to the same assignee as the present invention now U.S. Pat. No. 3,202,990. The other is a patent application of Sidney P. Applebaum, Paul W. Howells and James C. Kovarik entitled "Multiple Intermediate Frequency Side-Lobe Canceller", application Ser. No.

165,259, which was filed on Jan. 9, 1962 and assigned to the same assignee as the present invention.

Side lobe cancellers of the kind briefly mentioned function very successfully when they are used to cancel directly received jammer signals. Even when the antennas are facing away from the source of the jammer signals, directly received signals, such as those received in the main antenna back-lobe L', are correlated with signals received by the omni-antennas to provide for cancellation. Cancellation of such direct jammer signals can be attained, assuming a single jammer source, in situations such as are illustrated in FIG. 3. For example, beam A which goes directly to the main back lobe L' of the antenna M arrives at nearly the same time as beam B received by the omni-antenna A1 so that cross correlation is relatively easy. Parenthetically, it may be well to note also that the amplitudes of signals resulting from those received on A1 and in the back lobe of the antenna M are automatically adjusted, in circuits not shown, to the same level, so that cross correlation is possible for that reason also. As will be indicated later, this equalization of amplitude does not occur in many situations in which scatter noise is involved.

Consider a different situation in FIG. 3, in which beam C is reflected as beams D and E by a building or other reflecting object at 6 located at a distance from the antenna M. The strength of D and E will certainly be much less than that of C and typically may be down about 20 db. If these relatively weak signals are received in the main lobe L of the antenna and in the omni-antenna, the resulting signals will have a difference in amplitude of about 20 db due to the high gain in the antenna M as compared with the omni-antenna. This means that the reflected signal or scatter noise in the omni-antenna will be too small (down 20 db) to be usable in effecting cancellation of the reflected signal in the main antenna. However, the signal B directly received by A1 is strong enough (being about the same amplitude) but generally will be poorly correlated due to the differences in lengths of paths from the jammer.

The problem of cancelling reflected jammer signals, or scatter signals, through use of omni-antennas and cross correlators thus reduces to one of either increasing the amplitude of a portion only of the signals received by the omni-antenna or of altering the time relationships between the scatter signals in the omni-antenna and those in the main antenna. The solution employed in a preferred embodiment of the present invention involves changes in the time relationships of the signals so that a signal suitable for use in cancelling scatter energy is generated in the side lobe canceller. In particular, a delay line D1 is connected between an omni-antenna and a separate correlator or cancellation loop in the side lobe canceller as shown in FIG. 4. By use of the delay line D1 a signal may be derived from jammer J1 which will have an amplitude and time relationship suitable for cancellation of the scatter energy represented by E.

As was mentioned in the discussion of FIG. 2, it has been shown that the effects of a number of directly received jammer signals can be overcome to a large degree by the use of a like number of omni-antennas in conjunction with a like number of individual cancellers or cancellation loops in a side lobe canceller, giving rise to a device which may be called a multiple side lobe canceller. Such a multiple side lobe canceller can be used with a number of delay lines and a corresponding number of additional cancellation loops to cancel scatter energy which has been delayed within certain time limits. A block diagram showing a suitable arrangement for cancelling scatter energy arriving within two distinct time periods is shown in FIG. 5. FIG. 5 shows omni-antennas A1 and A2 in conjunction with delay lines D1 and D2 as they might be coupled to a multiple side lobe canceller.

A composite plot of residue signal remaining at the output of the cancellation system under various operating conditions is shown in FIG. 6. Dashed line 60 indicates a level of noise in various directions beyond the calibrated range of the receiver under heavy barrage jamming conditions. Solid line 62 shows the effects produced by insertion of a single side lobe canceller, with a large number of spikes of energy rising as high as 35 db above reference noise level. Solid line 64 demonstrates how much greater the cancellation can be when one delay line and corresponding loop is added to single side lobe canceller. Cancellation of many of the spikes in solid line 64 is possible with the addition of more delay lines and cancellation loops so that the noise level will approach the ideal, shown here as being below a level of 7 db on line 66.

In order better to show the results produced by this invention reference may be made to FIG. 7. In FIG. 7 the maximum obtainable cancellation ratio in db is plotted against the time delay existing between the scatter signal and the direct signal. This figure indicates how the cancellation ratio is limited by the delay introduced by an obstacle. For the case of a single jamming source and a single loop canceller the attainable cancellation ratio will decrease with delay until it reaches some minimum allowable value at time T beyond which cancellation will be inadequate. If a delayed loop including a separate delay line and cancellation loop is added, having a delay 2T, the cancellation ratio will rise and then decrease along the dashed line to some minimum allowable value at approximately 3T. If there are reflecting obstacles beyond 3T, one or more additional loops may be added which possess progressively more delay.

Scatter noise has been explained in connection with FIG. 3 and FIG. 4 as being due to unwanted reflections which are received by the main antenna. Experience has shown that scatter noise increases from a minimum value as the main antenna turns from a position directly facing the source of jammer signals to a peak value as the antenna faces 180° away from the source of jammer signals. This effect can be studied by an arrangement such as is shown in the plan view of FIG. 8 in which a jammer signal is shown with main antenna at M, an omni-antenna at A and a plurality of poles at P1, P2 ... P16.

Figure 9B:
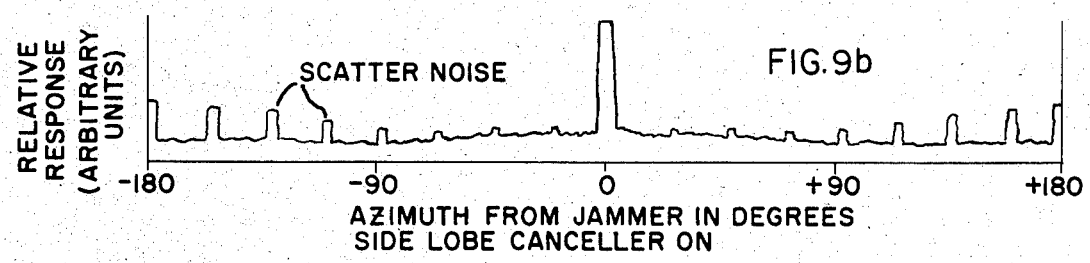
Figure 9C:
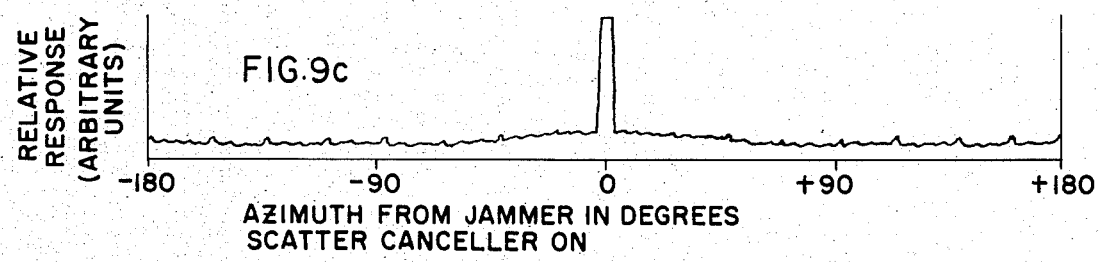

FIGS. 9a, 9b and 9c relate to the phenomenon of increasing scatter noise with increasing azimuth referred to in connection with the discussion of FIG. 8. FIG. 9a illustrates the relative amplitude of jammer signal response with the side lobe canceller turned off. It will be noted that the amplitude of jammer signal response decreases generally as the antenna faces further away from the jammer signal. With the side lobe canceller turned "on" cancellation occurs as indicated in FIG. 9b, but with progressively higher scatter noise reflected from the poles of FIG. 8 as reflections are received from poles closer to 180° from the zero point. With the scatter canceller "on", cancellation of the scatter noise is very good as indicated in FIG. 9c.

Turning to FIG. 10 for a more detailed showing of the operation of the embodiment of the invention disclosed in FIG. 4, we find a plurality of fan shaped loops in the upper left-hand corner of the figure which are labeled L, L1, L2, L3 and L4. The loop, or lobe, L is much the largest of the loops illustrated and is intended to show the principle lobe of an antenna receiver pattern while the small fan shaped lobes L1, L2, L3 and L4 etc. indicate side-lobes. As is well known in antenna theory, side-lobe responses are inherent in all conventional antennas. Where interference such as that from jammers is encountered in the principle lobe L certain steps may be taken to overcome it which are outside the scope of the present discussion, since the present invention is concerned primarily with lower levels of received energy than that of directly received jammer signals. All jammer signals received by the principle antenna M (through both the main and side lobes), together with any signals representing reflections from targets received in the lobe L, will be transmitted by the antenna M through the principle or main channel of the system. The main channel includes a mixer at 70 to provide IF signals, a local oscillator at 72 and a subtracting circuit or canceller at 74 which are coupled together by a line represented by 76. The main loop will connect to a terminal 78 and to an output terminal 3 from the cancelling or subtracting circuit 74.

All signals received by the omni-antenna A1 of FIG. 10 will be transmitted to the mixer 84 to be stepped down to the IF level. The signal from local oscillator 72 feeding mixer 84 is offset a predetermined amount from that feeding mixer 70. (The difference between them is exactly equal to the center frequency of the integrating filter 94 to be described in a moment.) The resulting IF signals are then supplied as inputs to the mixer 90 in an IF correlator 91, where the correlator 91 may be considered to be either an auto-correlator or a cross-correlator depending on how the input signals to mixers 90 are regarded. The IF signals are also supplied through the delay line D1, having a time delay 2T, to a second mixer 90 in a second correlator 91.

It will be understood that the effect of multiplying the signals from either 78 and 84 or from 78 and D1 in a mixer 90 and then integrating them in an integrating filter 94 is to perform a cross correlation on these signals. A result of this cross correlation is an output signal at 96 having very special properties, namely those of an error signal having an amplitude representative of the relative power of the jammer signals in the main and auxiliary channels and also having a phase relationship equal to the phase differences between the jammer signals in the main and auxiliary channels. The error signal at 96 is then supplied to mixer 92 where it is heterodyned with the IF signals from the mixer 84 (or the delay line D1) back to the frequencies and phases present in the main channel, so that new error signals are supplied at terminal 98. These new error signals are of such an amplitude and phase that when they are mixed with the signal received from the main antenna in the cancelling circuit 74 they will cancel the jammer signals and/or the scatter signals so that, ideally, only the signal representing target signals received in the main lobe L will be available at terminals 78 and 3.

It should be noted with respect to all of the foregoing that cancellation has been related solely to directly received jammer signals or to scatter energy. Reflections of radar signals received by the main lobe of the antenna are affected only slightly by the disclosed cancelling circuit. A number of reasons may be ascribed for this, all of which relate to optimization of system designs to isolate the desired radar reflections. First of all, the main antenna is designed to show a high gain for signals occurring in its main lobe and to de-emphasize signals appearing in its side lobes. Secondly, the auxiliary antennas are intentionally made low in gain, comparable with the side-lobe response and, therefore not normally able to materially reduce the amplitude of a signal appearing in the main lobe. Another reason for the thorough separation of desired signals and jammer signals is found when power relationships are considered. The desired signals are pulses of relatively high peak power, but very low average power. The jammer signals, in order to jam at all ranges, must be continuous signals having low peak power but high average power. Consequently, the systems used for cancelling jammer signals in this invention are preferably made to have a response time requiring high average power before they can generate cancelling signals. Having low average power, the desired signals cannot cause the systems to generate cancelling signals. Only the undesired signals are cancelled.

Further discussion of the operation of the correlators of FIG. 10 may be useful to complete the picture of the manner of operation of the invention. In this connection the question might be raised (especially where many such correlators are used) as to how each correlator can correctly adjust the signal in its own channel to the necessary phase and amplitude when the input to each correlator from point 78 includes the residual output errors left over after *all* the correlator correction signals and undesired signals have been applied to the cancelling circuit. This question may best be answered by considering the nature of the loops (which may be called cancellation loops) which include the correlators. Each of these loops includes a feedback circuit from a point 78 to a mixer 90 where the residue signal from point 78 is mixed with signals either from the mixer 84 or from a delay line D1, D2 etc. The resulting mixed signal in mixer 90 is integrated in filter 94 to provide a signal at 96. The signal at 96 is then mixed with the signal from the mixer 84 or from one of the delay lines to provide a correcting signal of a phase and amplitude tending to reduce the undesired signals at terminal 78 toward zero. If there is only one such correcting loop (or correlation loop or cancellation loop) 100 having one correlator and more than one jammer signal is present only a partial correction of the undesired signal at 78 is possible, since the one correlator cannot completely compensate for phase and amplitude difference in two or more signals. Two correcting or cancellation loops 100 in effect add an extra "degree of freedom" and will tend to aid each other as each will tend to reduce the undesired residue signal at 78 and if there are as many correcting loops as undesired signals good cancellation is possible. That the correcting or cancellation (or correlation) loops all act as servos is a key concept to understanding this aspect of the invention. As a servo, each additional such loop will add to the total correction possible, since the corrections applied by each one affects what the others can do.

It will thus be seen that the objects set forth above, and those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

What I claim as new and desire to secure by Letters Patent of the United States is:

1. A signal processor for receiving desired signals and undesired signals and for cancelling the undesired signals comprising:

a main signal transmitting channel capable of imparting high gain to desired signals and relatively low gain to most undesired signals, a subtracting circuit connected in said main signal transmitting channel between its input and output;

two auxiliary signal transmitting channels capable of imparting low gain to said desired signals and to said undesired signals, a delay line connected in series with one of said auxiliary channels to provide a delay to desired and undesired signals in said channel such as to bring said undesired signals into time synchronization with undesired signals in said main signal transmitting channel, means including a separate correlator connected between the output of said main channel and each of said auxiliary channels to correlate said desired and undesired signals and to generate error signals adjusted in phase and in amplitude to correspond to the undesired signals in said main channel, and means for applying said error signals to said subtracting circuit to reduce the magnitude of said undesired signals at the output of said main channel.

2. A signal processor substantially as claimed in claim 1 in which said main signal transmitting channel includes a directional antenna to impart said high gain to desired signals received in its main lobe.

3. A signal processor substantially as claimed in claim 1 in which said auxiliary signal transmitting channels include an omni-directional antenna for receiving radiant energy from all directions and for imparting essentially equal gain to desired and undesired signals.

4. A signal processor for eliminating undesired signals from among desired signals where the undesired signals include first and second signal group differing from each other primarily in their time occurrence with the second group being delayed in time with respect to the first, said processor comprising:

a main signal transmission channel including an input to which is applied said desired signals and said first and second groups of undesired signals, and including an output for signals as transmitted therethrough;

first and second auxiliary signal transmission channels each including an input to which is applied at least said first group of undesired signals and each including an output, said second auxiliary channel further including means for delaying signals transmitted therethrough for a time corresponding to said time delay between said first and second undesired signal groups so as to provide, at the output of this channel, signals corresponding in time to said second undesired signal group;

first correlation means connected to receive output signals from said main and first auxiliary channels and operative to produce a first correcting signal by correlation of received signals of said first undesired group;

second correlation means connected to receive output signals from said main and second auxiliary channels and operative to produce a second correcting signal by correlation of received signals of said second undesired group and of signals of said first group placed in time correspondence with said second group by said time delay means;

and signal subtracting means connected in said main channel to receive said first and second correcting signals and operative to subtract them from the signals as transmitted by said main channel so as to at least partially cancel both said groups of undesired signals while passing said desired signals.

5. A processor as defined in claim 4 wherein said second group of undesired signals includes a plurality of signals each differently delayed in time with respect to said first undesired signal group, wherein said time delay means comprises a plurality of delay elements each providing a delay period corresponding to the time delay of one undesired signal of said second group, and wherein said second correlation means comprises a plurality of correlators each connected to one of said time delay elements, whereby said second correcting signal as received by said subtracting means may provide at least partial cancellation of a plurality of undesired signals of said second group having different time delays.

6. A signal processor for cancelling a plurality of undesired signals differing primarily in their time occurrence, comprising:

a first processor channel connected to receive said undesired signals;

a second processor channel connected to receive said undesired signals at a plurality of distinct times each differently delayed with respect to the time of reception in said first channel;

a plurality of signal correlators each operative to produce a correcting signal by correlation of applied signals;

means coupling the output of said second channel to said correlators to provide one applied signal to each said correlator;

means coupling the output of said first channel to each of said correlators with a time delay for each differing correspondingly to said differences in signal reception times in said second channel, to provide another applied signal to each of said correlators enabling each to produce a correcting signal by correlation of second channel signals with first channel signals as thus delayed;

and a subtracting circuit in said second channel connected to receive the correcting signals produced by said correlators and operative to subtract said correcting signals from the signal content of said second channel to provide at least partial cancellation of undesired signals therein.

* * * * *